May 7, 1935.  R. R. TEETOR  2,000,263
FISHING ROD HANDLE
Filed Nov. 11, 1933
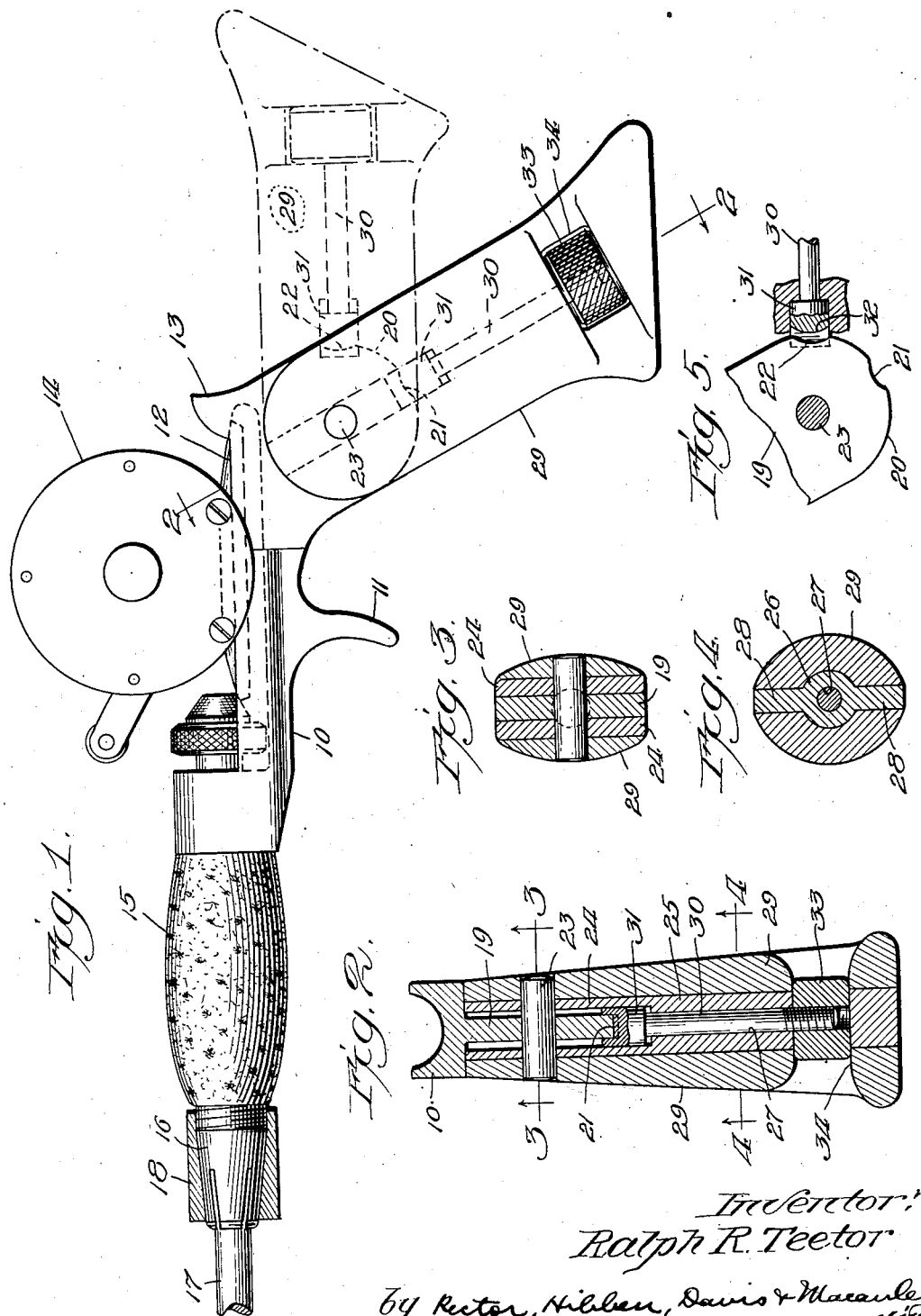
Inventor:
Ralph R. Teetor
by Rector, Hibben, Davis & Macauley Patented May 7, 1935

2,000,263

UNITED STATES PATENT OFFICE 2,000,263

FISHING ROD HANDLE

Ralph R. Teetor, Hagerstown, Ind.

Application November 11, 1933, Serial No. 697,603

12 Claims. (Cl. 43—23)

My invention relates to fishing rod handles and is concerned more particularly with an improvement on the type of handle described and claimed in my United States Letters Patent No. 1,898,323, dated February 21, 1933, although the essential feature of the present invention is not necessarily restricted to use with a rod which employs a reel.

The principal object of my invention is to provide a fishing rod handle having a grip which may be located in a position that constitutes substantially an elongation of the rod, which is a convenient casting position, or it may be shifted to a position that is downwardly inclined with respect to the rod, after the manner of a pistol grip, in which position it is highly convenient for trolling.

A further object is to associate with a grip having the foregoing characteristics a mechanism which is capable of holding the grip in either of its limiting positions, or in any intermediate position as the circumstances of use may dictate.

A further object is to provide a handle for fishing rods which not only embodies a handle having a versatile grip, but which is also adapted for the convenient carriage of a reel and for the ready reception of the fishing rod proper.

These and further objects of my invention will be set forth in the following specification, reference being had to the accompanying drawing and the novel means by which said objects are effectuated will be definitely pointed out in the claims.

In the drawing:

Figure 1 is a side elevation of my fishing rod handle showing the limiting positions of the grip proper and its relation to the usual reel and fishing rod.

Fig. 2 is a section along the line 2—2 in Fig. 1, looking in the direction of the arrows and showing the internal construction of the grip whereby it may be held in any one of a plurality of positions.

Figs. 3 and 4 are sections along the lines 3—3 and 4—4 in Fig. 2, looking in the direction of the arrows, and showing certain structural details of the grip.

Fig. 5 is a fragmentary sectional view of a portion of Fig. 1, showing the relation between the grip and the reel support when the former has been shifted to the dotted position shown in Fig. 1.

Referring to the drawing, the numeral 10 designates a reel support which, on its underside, is provided with a downwardly extending finger support 11 and on its upper side with a depression 12. At the rear end of the depression, as viewed in Fig. 1, a thumb support 13 projects upwardly above the base of the depression and, seated in the latter, is a reel 14. This reel is preferably held in position in the depression 12 according to the method disclosed in the patent noted above, this arrangement in and of itself forming no part of the present invention.

The forward end of the support 10 is provided with an auxiliary grip 15 which may be covered with cork or other suitable material and which may be employed by the fisherman at such times as he desires to shorten his grasp on the handle, or in conjunction with the novel grip hereinafter described. Extending forwardly from the handle 15 is a tapered, annular, split clamp 16 which is provided with a suitable bore to receive a fishing rod 17. The latter may be held in the position shown by means of a clamping nut 18 which is threaded on the clamp 16.

Except for the specific manner of holding the fishing rod 17, the parts described above and their relation to each other are essentially identical with those disclosed in the aforementioned Letters Patent, and they have been referred to as illustrating a characteristic type of handle with which my improved swivel grip may be employed.

The support 10 is provided with a tongue extension 19 that inclines downwardly from the underside of the reel support adjacent the thumb support 13 and its lower edge may be rounded as shown at 20 in Fig. 5. This rounded edge is provided with a curved recess 21 at the bottom of the extension and with a second recess 22 which is located above the recess 21.

A pivot pin 23 is mounted in the extension 19 and its extremities pivotally support the forked end 24 of a rigid core 25 which may be made of metal or any suitable hard substance. The core 25 is provided with a central, enlarged portion 26 having a bore 27 and wings 28 project laterally from said portion. Suitably shaped members 29, which may be formed of cork or other suitable grip material, overlie the core 25, including the wings 28 and these members, together with the core, form the principal grip of the handle.

A stem 30 is slidably mounted in the bore 27 and its upper end, as viewed in Fig. 2, is enlarged to form a forked head 31 which slides between the members forming the forked end 24 of the core. The forked head 31 is intended to engage the curved edge 20 of the extension 19 and the surface between the members forming the fork may be curved as at 32 in order to more effectively seat in the recess 21 or 22, as hereinafter described.

The lower end of the stem 30 is threaded to receive a nut 33 which is mounted in a slot 34 that extends through the grip, including the core 26 and the members 29. The nut 33 is accordingly exposed for convenient operation by the user and the width of the slot 34 is such that the nut is held against endwise movement, thereby insuring that the stem 30 can be shifted along the core into contact with the extension, or withdrawn therefrom as desired, depending upon the direction of rotation of the nut.

As indicated in Fig. 1, the grip is located in a downwardly inclined position, corresponding to the grip of a pistol and, in this position, the handle is conveniently located for trolling, for example, since a minimum of strain is placed upon the wrist and forearm of the user. Many fishermen, however, prefer to employ a straight handle for casting and it will be readily understood that my improved handle may be readily adapted for use under such conditions simply by loosening the contact of the stem 30 with the extension 19, whereupon the grip may be shifted to the dotted position shown in Fig. 1, where it is substantially an elongation of the fishing rod proper. Moreover, the handle is capable of being fixed in any intermdiate position between the limiting position noted by frictionally engaging the stem head 31 against the curved edge 20. If desired, other recesses than the two shown in Fig. 5 may be employed in order to provide a more effective contact. In either of the positions shown, or in any intermediate position in which the grip may be placed, it is further obvious that the reel may be readily controlled by the thumb which may be rested upon the thumb support 13 for this purpose.

I claim—

1. A fishing rod handle arranged to conveniently position the hand for casting and trolling comprising in combination a part adapted for attachment to a fishing rod, a grip swiveled on the part between a position constituting generally an elongation of the part and a downwardly extending position below the part, and means for retaining the grip in either position.

2. A fishing rod handle arranged to conveniently position the hand for casting and trolling comprising in combination a part adapted for attachment to a fishing rod, a grip swiveled on the part between a position constituting generally an elongation of the part and a downwardly extending postion below the part, and means carried by the grip and engageable with the part for retaining the grip in either position.

3. A fishing rod handle arranged to conveniently position the hand for casting and trolling comprising in combination a part adapted at one end for attachment to a fishing rod and having an extension at the opposite end, a grip having a forked end embracing and pivoted on the extension, the grip being shiftable between a position constituting generally an elongation of the part and a downwardly extending position below the part, and means carried by the grip and engageable with the extension for retaining the grip in either position.

4. A fishing rod handle arranged to conveniently position the hand for casting and trolling comprising in combination a part adapted for attachment to a fishing rod, a grip swiveled on the part between a position constituting generally an elongation of the part and a downwardly extending position below the part, and means carried by the grip and engageable with the part for retaining the grip in any position between and including its limiting positions comprising a stem shiftable within the grip for engagement with the part, and a nut threaded on the stem for actuating the same and held against endwise movement by the grip, the nut projecting externally of the grip for convenient operation.

5. A fishing rod handle comprising in combination a part adapted at one end for attachment to a fishing rod and having an extension at the opposite end, a hollow rigid core having a forked end embracing and pivoted on the extension, members overlying the core to form a grip, the grip being shiftable from a position constituting generally an elongation of the part and a downwardly extending position below the part, and means for retaining the grip in any position between and including its limiting positions comprising a stem shiftable within the core for engagement with the extension and a nut threaded on the stem for actuating the same and held against endwise movement by the grip, the nut projecting without the grip for convenient operation.

6. A fishing rod handle comprising in combination a part adapted at one end for attachment to a fishing rod and having at its opposite end an extension provided with spaced recesses in its end face, a grip having a forked end embracing and pivoted on the extension, the grip being shiftable between a position constituting generally an elongation of the part and a downwardly extending position below the part, and means for retaining the grip in any position between and including its limiting positions comprising a stem shiftable within the grip and having a nose for engagement with the end face to incluude its recesses, and a nut threaded on the stem for actuating the same and held against endwise movement by the grip, the nut projecting externally of the grip for convenient operation.

7. A fishing rod handle comprising in combination a part adapted at one end for attachment to a fishing pole and having an extension at the opposite end, a grip having a forked end embracing and pivoted on the extension, the grip being shiftable between a position constituting generally an elongation of the part and a downwardly extending position below the part, and means for retaining the grip in any position between and including its limiting positions comprising a stem shiftable within the grip and having a forked end for embracing and engaging the extension, and a nut threaded on the stem for actuating the same and held against endwise movement by the grip, the nut projecting externally of the grip for convenient operation.

8. A fishing rod handle comprising in combination a part having a bore at one end to receive a fishing rod and a deep depression in its upper side, the axis of the bore being disposed above the bottom of the depression which is to receive the base of a reel, a thumb support located at the opposite end of the part and projecting upwardly substantially above the bottom of the depression, and a grip swiveled on the part adjacent the thumb support and shiftable between a position constituting generally an elongation of the part and a downwardly extending position below the part, and means for retaining the grip in either position.

9. A fishing rod handle comprising in combination a part having a bore at one end to receive a fishing rod and a deep depression in its upper side, the axis of the bore being disposed above the bottom of the depression which is to receive the base of a reel, a thumb support located at the opposite end of the part and projecting upwardly substantially above the bottom of the depression, a grip on the part below the thumb support and shiftable between a position constituting generally an elongation of the part and a downwardly extending position below the part, and means for retaining the grip in any position between and including its limiting positions.

10. A fishing rod handle arranged to conveniently position the hand for casting and trolling comprising in combination a part adapted for attachment to a fishing rod, a grip shiftable between a position constituting generally an elongation of the part, and a position on one side of the part, and means for retaining the grip in either position.

11. A fishing rod handle arranged to conveniently position the hand for casting and trolling comprising in combination a part adapted at one end for attachment to a fishing rod and having at the opposite end upper and lower engaging devices, a grip shiftable on the part between a position constituting generally an elongation of the part and a downwardly extending position below the part, and means adapted to cooperate with the devices for retaining the grip in either position.

12. A fishing rod handle arranged to conveniently position the hand for casting and trolling comprising in combination a part adapted at one end for attachment to a fishing rod and having an extension at the opposite end provided with a curved surface, a grip shiftable on the extension between a position constituting generally an elongation of the part and a downwardly extending position below the part, and means engageable with the surface for retaining the grip in any position between and including its limiting positions.

RALPH R. TEETOR.